US010061166B2

(12) United States Patent
Tsung et al.

(10) Patent No.: US 10,061,166 B2
(45) Date of Patent: Aug. 28, 2018

(54) LIQUID CRYSTAL DISPLAY PANEL

(71) Applicant: AU Optronics Corporation, Hsin-Chu (TW)

(72) Inventors: Jieh-Wen Tsung, Hsin-Chu (TW); Cho-Yan Chen, Hsin-Chu (TW); Wan-Ling Liang, Hsin-Chu (TW); Cheng-Wei Lai, Hsin-Chu (TW); Tien-Lun Ting, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/365,473

(22) Filed: Nov. 30, 2016

(65) Prior Publication Data

US 2017/0153514 A1 Jun. 1, 2017

(30) Foreign Application Priority Data

Dec. 1, 2015 (TW) .............................. 104140042 A

(51) Int. Cl.
*G02F 1/1343* (2006.01)
*G02F 1/1337* (2006.01)
(Continued)

(52) U.S. Cl.
CPC ...... *G02F 1/134309* (2013.01); *G02F 1/0045* (2013.01); *G02F 1/1393* (2013.01);
(Continued)

(58) Field of Classification Search
CPC ......... G02F 1/134309; G02F 1/133707; G02F 1/136286; G02F 1/133711;
(Continued)

(56) References Cited

U.S. PATENT DOCUMENTS 6,721,024 B1 * 4/2004 Kishimoto ........ G02F 1/133707
349/123

7,369,204 B1 5/2008 Choi et al.
(Continued)

FOREIGN PATENT DOCUMENTS

EP           1070981 A1    1/2001
TW       200846773 A    12/2008
(Continued)

OTHER PUBLICATIONS

Taiwan Patent Office "Office Action" dated Jun. 27, 2016, Taiwan.

*Primary Examiner* — Kevin Quarterman
(74) *Attorney, Agent, or Firm* — WPAT, PC

(57) ABSTRACT

A liquid crystal display panel includes a first and a second substrate, scan lines, data lines, pixel structures, a counter electrode layer, and a liquid crystal layer. The scan lines, the data lines, and the pixel structures are located above the first substrate. Each of the pixel structures includes a first active device and a first pixel electrode. The first active device is electrically connected to the scan line and the data line. The first pixel electrode is electrically connected to the first active device and has a plurality of first stripe portions. Two adjacent first stripe portions define a first slit. The first stripe portion has a width L, the first slit has a width S, the first stripe portions have a pitch p there between, and p=L+S. The liquid crystal layer is disposed between the first and second substrates and has a thickness d. The liquid crystal layer has a splay elastic constant $k_{11}$ and a bend elastic constant $k_{33}$, $0<(k_{11}/k_{33})<1$, and the liquid crystal display panel represented by a formula (1):

$$\frac{1}{2}\sqrt{\frac{k_{11}}{k_{33}}} \leq \frac{p}{2d} \leq \sqrt{\frac{k_{11}}{k_{33}}}. \tag{1}$$

17 Claims, 8 Drawing Sheets

(51) Int. Cl.
  *G02F 1/1362* (2006.01)
  *G02F 1/139* (2006.01)
  *G02F 1/00* (2006.01)
  *G02F 1/1335* (2006.01)
  *G02F 1/1368* (2006.01)
  *G02F 1/137* (2006.01)

(52) U.S. Cl.
  CPC .. *G02F 1/133707* (2013.01); *G02F 1/133711* (2013.01); *G02F 1/136286* (2013.01); *G02F 1/137* (2013.01); *G02F 1/1368* (2013.01); *G02F 1/13439* (2013.01); *G02F 1/133514* (2013.01); *G02F 2001/13712* (2013.01); *G02F 2201/121* (2013.01); *G02F 2201/123* (2013.01)

(58) Field of Classification Search
  CPC ....... G02F 2001/13712; G02F 1/13439; G02F 1/137; G02F 1/133514; G02F 1/1368; G02F 2201/123; G02F 2201/121
  See application file for complete search history.

(56) References Cited

U.S. PATENT DOCUMENTS

| | | |
|---|---|---|
| 8,134,663 B2 | 3/2012 | Uehara et al. |
| 2007/0216837 A1 | 9/2007 | Ono |
| 2008/0231781 A1 | 9/2008 | Ge et al. |
| 2009/0086139 A1 | 4/2009 | Pai et al. |
| 2011/0075074 A1 | 3/2011 | Gauza et al. |
| 2012/0002148 A1* | 1/2012 | Pai .................. G02F 1/133711 349/117 |
| 2012/0190897 A1 | 7/2012 | Yamashita et al. |

FOREIGN PATENT DOCUMENTS

| | | |
|---|---|---|
| TW | 200914915 A | 4/2009 |
| TW | 201124508 A | 7/2011 |
| TW | 201200940 A | 1/2012 |

* cited by examiner

LIQUID CRYSTAL DISPLAY PANEL

CROSS-REFERENCE TO RELATED APPLICATION

This application claims the priority benefit of Taiwan application serial no. 104140042, filed on Dec. 1, 2015. The entirety of the above-mentioned patent application is hereby incorporated by reference herein and made a part of this specification.

BACKGROUND

Technical Field

The present disclosure relates to a liquid crystal display panel, and in particular, to a liquid crystal display panel having a specific liquid crystal material matching with a pixel structure.

Related Art

Flat display panels having excellent features such as radiation free and high definition have dominated the market. Common flat panel displays include liquid crystal displays, plasma displays, organic electroluminescent displays, and the like. By using the currently most popular liquid crystal displays as an example, the liquid crystal display mainly includes a pixel array substrate, a color filter substrate, and a liquid crystal layer between the pixel array substrate and the color filter substrate. Generally, liquid crystal molecules in the liquid crystal layer have a splay elastic constant ($k_{11}$) and a bend elastic constant ($k_{33}$). The two coefficients can control deformation of the liquid crystal molecules, thereby controlling the arrangement manner when the liquid crystal molecules are driven. The current liquid crystal molecule's $k_{11}$ is approximately equal to $k_{33}$. However, such liquid crystal material cannot effectively improve light transmittance of the display panel in a high resolution. Therefore, how to optimize the light transmittance in the high resolution is really a topic in urgent need to be solved by researchers.

SUMMARY

The present disclosure provides a liquid crystal display panel, which can effectively improve the light transmittance.

The liquid crystal display panel of the present disclosure includes a first substrate, a plurality of scan lines, a plurality of data lines, a plurality of pixel structures, a second substrate, a counter electrode layer and a liquid crystal layer. The scan lines and the data lines are disposed on the first substrate. The pixel structures are disposed on the first substrate, and the pixel structures are electrically connected to one of the corresponding scan lines and one of the corresponding data lines. Each pixel structure includes a first active device and a first pixel electrode. The first active device is electrically connected to one of the scan lines and one of the data lines. The first pixel electrode is electrically connected to the first active device. The first pixel electrode has a plurality of first strip portions, and two adjacent first strip portions define a first slit. The first strip portion has a width L, the first slit has a width S, the first strip portions have a pitch p there between, and p=L+S. The second substrate is disposed to face the first substrate. The counter electrode layer is disposed on the second substrate and is located between the first substrate and the second substrate. The liquid crystal layer is disposed between the first substrate and the second substrate, and the liquid crystal layer has a thickness d between the first substrate and the second substrate. The liquid crystal layer has a splay elastic constant $k_{11}$ and a bend elastic constant $k_{33}$, and $0<(k_{11}/k_{33})<1$. The liquid crystal display panel represented by the following formula (1):

$$\frac{1}{2}\sqrt{\frac{k_{11}}{k_{33}}} \leq \frac{p}{2d} \leq \sqrt{\frac{k_{11}}{k_{33}}}. \qquad (1)$$

Based on the above, the liquid crystal display panel of the present disclosure selects a liquid crystal material having a feature of $0<(k_{11}/k_{33})<1$ and a specific thickness, matching with a design of a specific pixel structure represented by the formula (1), so that the light transmittance of the liquid crystal display panel can be effectively improved.

In order to make the aforementioned features and advantages of the present disclosure comprehensible, embodiments accompanied with figures are described in detail below.

DETAILED DESCRIPTION

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

As used herein, "around", "substantially", "about" or "approximately" shall generally mean within 20 percent, preferably within 10 percent, and more preferably within 5 percent of a given value or range. Numerical quantities given herein are approximate, meaning that the term "around", "substantially", "about" or "approximately" can be inferred if not expressly stated.

As used herein, the terms "comprising", "including", "carrying", "having", "containing", "involving", and the like are to be understood to be open-ended, i.e., to mean including but not limited to.

Figure 1:
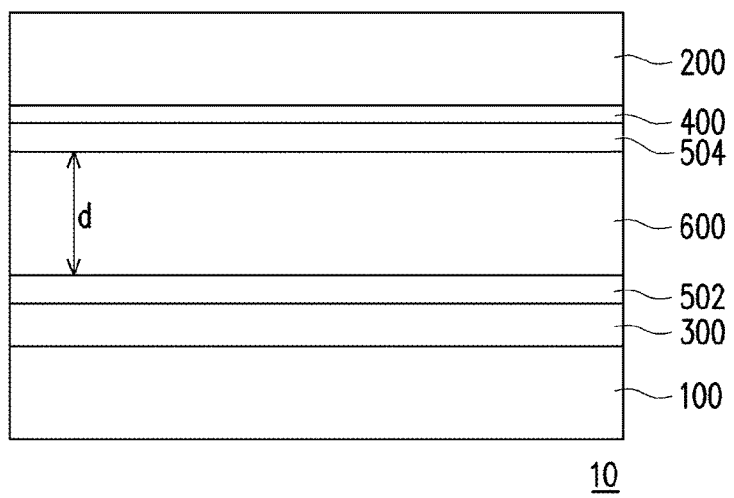
FIG. 1 is a schematic cross-sectional diagram of a liquid crystal display panel according to an embodiment of the present disclosure.

FIG. 1 is a schematic sectional diagram of a liquid crystal display panel 10 according to an embodiment of the present disclosure. Referring to FIG. 1, the liquid crystal display panel 10 includes a first substrate 100, a second substrate 200, an active device array layer 300, a counter electrode layer 400, a first alignment layer 502, a second alignment layer 504 and a liquid crystal layer 600.

The material of the first substrate 100 may comprise glass, quartz, organic polymers, metal, or other suitably materials. The first substrate 100 is provided with an active device array layer 300, and the active device array layer 300 will be described in detail in the following paragraphs.

The second substrate 200 is disposed at an opposite side of the first substrate 100 and face to the first substrate 100. The material of the second substrate 200 may comprise glass, quartz, organic polymers, or other suitably materials. When the material of the first substrate 100 is not metal, the material of the second substrate 200 may be substantially the same as or different from the material of the first substrate 100. In addition, in order that the liquid crystal display panel 100 can present multiple colors, a color filter layer (not shown) can disposed on the first substrate 100 or the second substrate 200, and the color filter layer includes red, green and blue filtering patterns or other suitably color patterns. In other words, the second substrate 200 may be a color filter substrate or the first substrate 100 may be a design of Color filter on Array (COA) or Array on Color filter (AOC). In addition, the liquid crystal display panel 10 may further be provided with a shielding pattern layer (or referred to as a black matrix, not shown) on the second substrate 200 or the first substrate 100, and disposed between filtering patterns of the color filter array.

The second substrate 200 is provided with a counter electrode layer 400, and the counter electrode layer 400 is located between the first substrate 100 and the second substrate 200. The counter electrode layer 400 is a transparent conductive layer, and a material thereof includes a metal oxide, for example, indium tin oxide or indium zinc oxide. The counter electrode layer 400 completely covers the second substrate 200, or is disposed on the second substrate 200 in a patterned manner. In this embodiment, the counter electrode layer 400 is connected to a common voltage (Vcom), and when a voltage different from the common voltage is applied to the active device array layer 300, a vertical electrical field is generated between the active device array layer 300 and the counter electrode layer 400, so as to drive liquid crystal molecules in the liquid crystal layer 600 between the active device array layer 300 and the counter electrode layer 400.

The first alignment layer 502 is disposed on the active device array layer 300, so as to align the liquid crystal layer 600. On the other hand, the second alignment layer 504 is disposed on the counter electrode layer 400, so as to align the liquid crystal layer 600. The first alignment layer 502 and the second alignment layer 504 are, for example, consist of organic materials, and may align the liquid crystal layer 600 in a contact or non-contact alignment manner. In this embodiment, the first alignment layer 502 and the second alignment layer 504 can not need to undergo a rubbing process, but not limit to.

The liquid crystal layer 600 is located in the space formed by the first alignment layer 502 and the second alignment layer 504. In this embodiment, the liquid crystal layer 600 is negative-type liquid crystal, and dielectric anisotropy $\Delta\in$ thereof is substantially between $-2.0$ and $-5.0$. On the other hand, the thickness of the liquid crystal layer 600 is d (also called cell gap d), and the thickness d is substantially between 2.7 µm and 3.5 µm. The liquid crystal display panel of this embodiment is a liquid crystal display panel using the Polymer-Stabilized Alignment (PSA) technology, and therefore, the liquid crystal layer 600 comprises liquid crystal molecules, and the liquid crystal layer 600 may be or may be not further comprise some monomeric compounds. In other words, when the display panel does not perform an illumination process of the monomeric compounds, the liquid crystal layer 600 includes liquid crystal molecules and the monomeric compounds. When the display panel is performing the illumination process of the monomeric compounds, the monomeric compounds polymerize to form a polymer thin film on the surface of the active device array layer 300. Therefore, after the liquid crystal display panel performs the illumination process of the monomeric compounds, the liquid crystal layer 600 mainly includes liquid crystal molecules.

In this embodiment, the liquid crystal molecules in the liquid crystal layer 600 basically have a splay elastic constant $k_{11}$ substantially between $1.1\times10^{-11}$ N and $2.0\times10^{-11}$ N, and a bend elastic constant $k_{33}$ substantially between $1.1\times10^{-11}$ N and $2.0\times10^{-11}$ N. In addition, a ratio of $k_{11}$ to $k_{33}$ of the liquid crystal layer 600 is between 0 and 1, and preferably $0<(k_{11}/k_{33})<0.87$, and the ratio of $k_{11}$ to $k_{33}$ has no unit.

Figure 2:
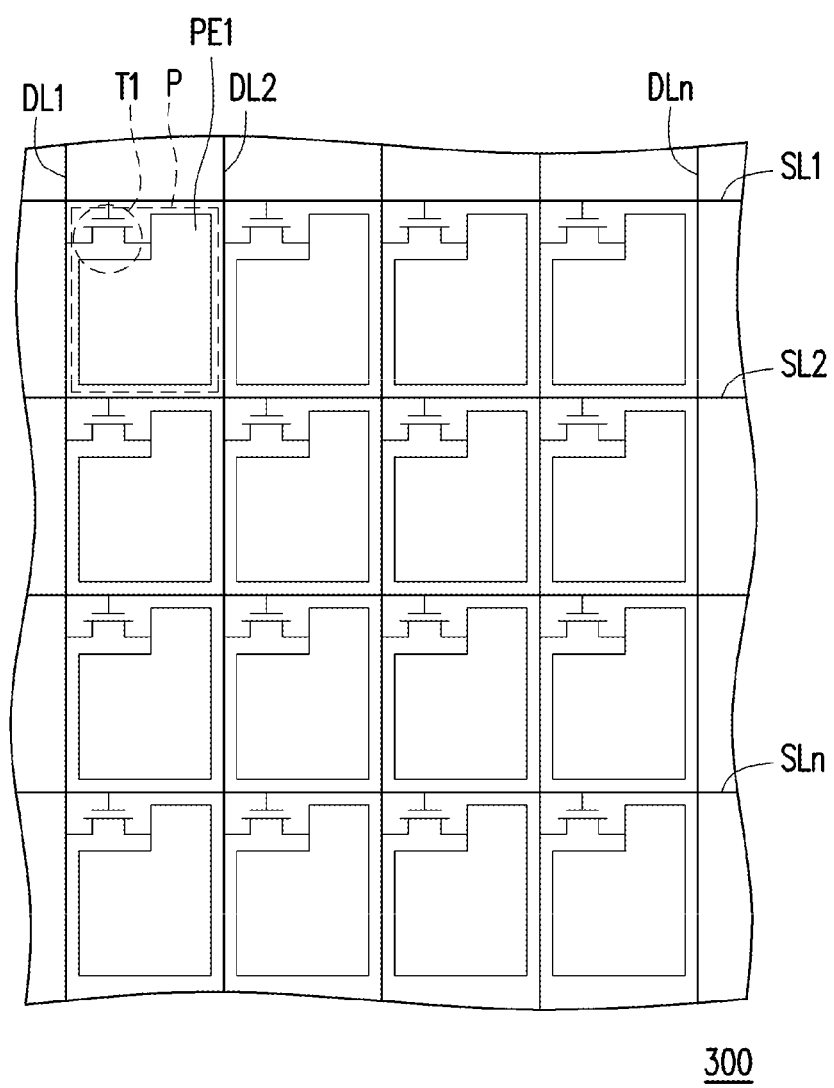
FIG. 2 is a schematic top view of an active device layer in the liquid crystal display panel in FIG. 1.

FIG. 2 is a schematic top view of an active device layer 300 in the liquid crystal display panel in FIG. 1. The active device array layer 300 will be described in detail in the following. Referring to FIG. 2 first, the active device array layer 300 includes a plurality of scan lines SL1~SLn, a plurality of data lines DL1~DLn, and a plurality of pixel structures P. The scan lines SL1~SLn and the data lines DL1~DLn are disposed alternatively, and each pixel structure is electrically connected to one of the corresponding scan lines SL1~SLn and one of the corresponding data lines DL1~DLn. In the embodiment of the present disclosure, the scan lines SL1~SLn and the data lines DL1~DLn are disposed alternatively to form the plurality of pixel structures P, but the present disclosure is not limited thereto. In the embodiment of the present disclosure, an extension direction of the scan lines SL1~SLn and an extension direction of the data lines DL1~DLn are not parallel to each other. Preferably, for example, the extension direction of the scan lines SL1~SLn is substantially perpendicular to the extension direction of the data lines DL1~DLn. By taking consideration of conductivity, an insulating layer is disposed between the scan lines SL1~SLn and the data lines DL1~DLn. The scan lines SL1~SLn and the data lines DL1~DLn generally use metal materials. However, the present disclosure is not limited thereto, and according to other embodiments, the scan lines SL1~SLn and the data lines DL1~DLn may also use other conductive materials. For example, alloys, nitrides of metal materials, oxides of metal materials, oxynitrides of metal materials, or other suitable materials, or a stacked layer of a metal material and another conductive material.

Figure 3:
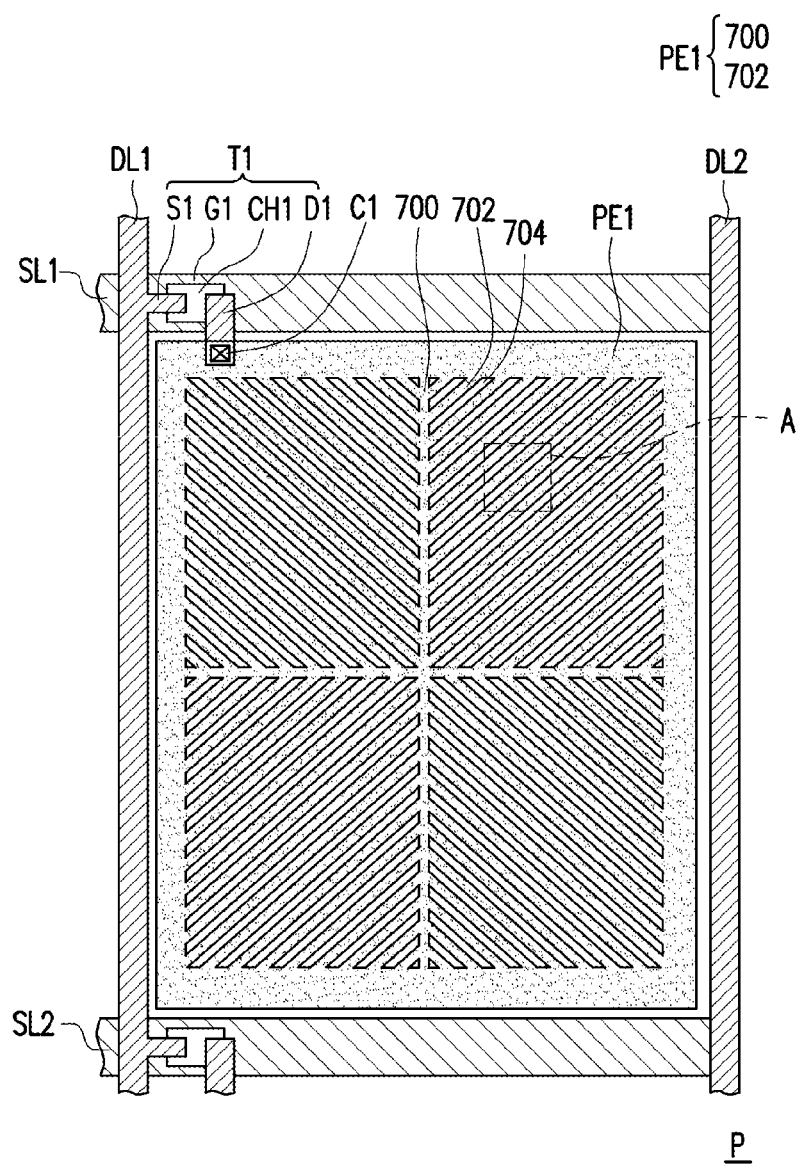
FIG. 3 is a schematic enlarged top view of a pixel structure in the active device layer in FIG. 2.

FIG. 3 is a schematic enlarged top view of a pixel structure P in the active device layer 300 in FIG. 2. Referring to FIG. 3, each pixel structure P includes a first active device T1 and a first pixel electrode PE1. The first active device T1 includes a first gate G1, a first channel layer CH1, a first source S1 and a first drain D1. Referring to FIG. 3, in this embodiment, the first active device T1 is electrically connected to a corresponding scan line (using a scan line SL1 as an example) and a corresponding data line (using a data line DL1 as an example). Specifically, the first gate G1 is electrically connected to the scan line SL1. The first channel layer CH1 is located above the first gate G1. The first source S1 and the first drain D1 are disposed above the first channel layer CH1, and the first source S1 is electrically connected to the data line DL1. In this embodiment, the first active device T1 is, for example, a thin film transistor having a bottom gate, but the present disclosure is not limited thereto. In another embodiment, the first active device T1 may also be a thin film transistor having a top gate, that is, the first channel layer CH1 is located under the first gate G1. In addition, the first pixel electrode PE1 is electrically connected to the first drain D1 of the first active device T1 through a first contact window C1. The first gate G1, the first source S1 and the first drain D1 are, for example, made of metal materials, but the present disclosure is not limited thereto. On the other hand, the material of the first channel CH1 may select amorphous silicon, polycrystalline silicon, or an oxide semiconductor material (for example, Indium-Gallium-Zinc Oxide (IGZO), ZnO, SnO, Indium-Zinc Oxide (IZO), Gallium-Zinc Oxide (GZO), Zinc-Tin Oxide (ZTO) or Indium-Tin Oxide (ITO)), but the present disclosure is not limited thereto. In addition, the pixel structure P may further include a common electrode line (not shown) connected to the common voltage (Vcom) or floating. The common electrode line is overlapped with partial of the first pixel electrode PE1, so as to form a storage capacitor.

The first pixel electrode PE1 has a first body portion 700 and a plurality of first strip portions 702 connected to the first body portion 700. The first strip portions 702 are formed by extending the first body portion 700 in four directions. In other words, the first strip portions 702 extend from the first body portion 700 in four directions to edges of the first pixel electrode PE1, so as to form a fish bone pattern and define four alignment domain regions. On the other hand, two adjacent first strip portions 702 define a first slit 704.

Figure 4:
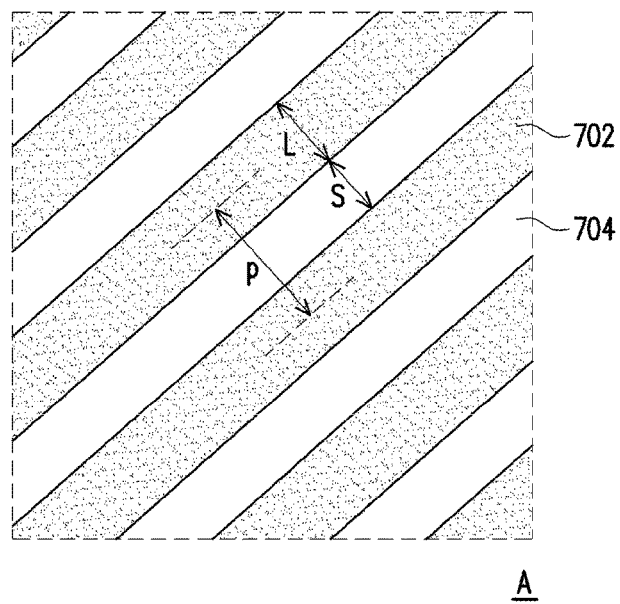
FIG. 4 is a schematic enlarged top view of a partial region in the pixel structure in FIG. 3.

FIG. 4 is a schematic enlarged top view of a partial region A in the pixel structure P in FIG. 3. Referring to FIG. 4, the first strip portion 702 has a width L, and the first slit 704 has a width S. In addition, two adjacent first strip portions 702 have a pitch p there between. In this embodiment, the pitch p is defined as a distance between center points of two adjacent first strip portions 702. In other words, the pitch p equals to the sum of the width L of the first strip portion 702 and the width S of the first slit 704. Specifically, the width L of the first strip portion 702 is substantially between 2 μm and 5 μm, and the width S of the first slit 704 is substantially between 1.5 μm and 5 μm. The pitch p is equal to the sum of the width L of the first strip portion 702 and the width S of the first slit 704, and therefore, the pitch p is substantially between 3.5 μm and 10 μm. It should be noted that, the pitch p preferably substantially ranges from 2.9 μm to 5.9 μm. In addition, the liquid crystal display panel 10 of the present disclosure represented by the following formula (1):

$$\frac{1}{2}\sqrt{\frac{k_{11}}{k_{33}}} \leq \frac{p}{2d} \leq \sqrt{\frac{k_{11}}{k_{33}}}. \quad (1)$$

For example, if a ratio of $k_{11}$ to $k_{33}$ is about 0.76, and the thickness d of the liquid crystal layer 600 is about 3 μm, it can be deduced from the above formula (1) that, the pitch p (that is, the width L of the first strip portions 702 pluses the width S of the first slit 704) must be substantially between 2.61 μm and 5.23 μm.

It should be noted that, in the present disclosure, the liquid crystal display panel 10 preferably represented by the following formula (2):

$$\frac{p}{2d} = \sqrt{\frac{k_{11}}{k_{33}}}. \quad (2)$$

In other words, in the case of the formula (2), the splay and bend of the liquid crystal molecules in the liquid crystal layer 600 can be balanced, and therefore, when the liquid crystal molecules are driven, a preferred arrangement manner may be provided. Therefore, the light transmittance of the liquid crystal display panel 10 can be improved.

Figure 5:
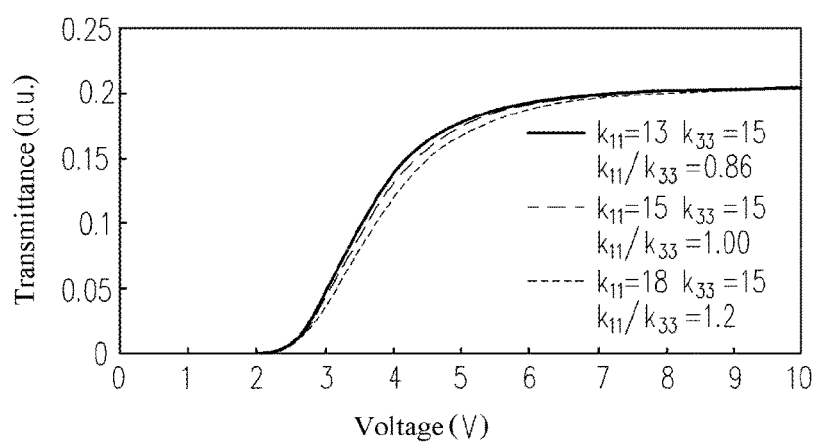
FIG. 5 is a transmittance-voltage curve graph of a comparison liquid crystal display panel and a liquid crystal display panel according to an embodiment of the present disclosure.

FIG. 5 is a transmittance-voltage curve graph of a comparison liquid crystal display panel and a liquid crystal display panel according to an embodiment of the present disclosure. Referring to FIG. 5, under the same voltage, when a ratio of $k_{11}$ to $k_{33}$ is 1.2 (greater than 1), the transmittance will be reduced compared with the situation when the ratio is 1. On the other hand, when the ratio of $k_{11}$ to $k_{33}$ is about 0.86 (less than 1), the transmittance will be greatly increased compared with the situation when the ratio is 1. Therefore, it can be known that when the ratio of $k_{11}$ to $k_{33}$ is less than 1, a preferred transmittance may be provided.

Figure 6:
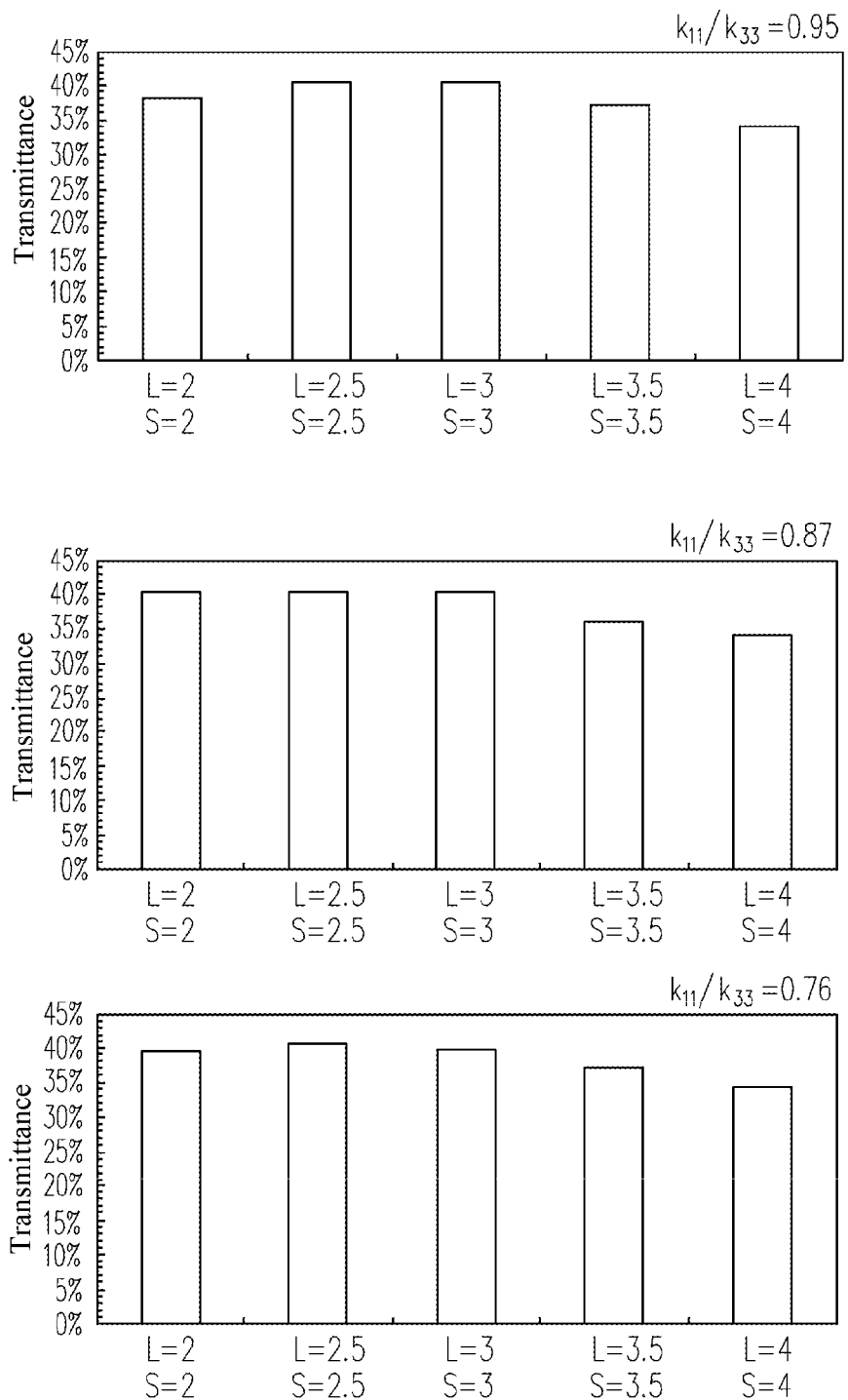
FIG. 6 is a bar chart of change in transmittance under different ($k_{11}/k_{33}$) ratios corresponding to different pitches of the strip portions of the liquid crystal display panel according to the embodiment of FIG. 3 of the present disclosure.

FIG. 6 is a bar chart of change in transmittance under different ($k_{11}/k_{33}$) ratios corresponding to different pitch of the first strip portions 702 of the liquid crystal display panel to the embodiment of FIG. 3 according of the present disclosure. Specifically, data in FIG. 6 is obtained by applying a voltage of 7.5 volts to the first pixel electrode PE1 in the liquid crystal display panel 10 in FIG. 3, so as to measure the transmittance of the liquid crystal display panel 10. Specific data corresponding to FIG. 6 is shown in Table 1.

TABLE 1

|  | L = 2<br>S = 2 | L = 2.5<br>S = 2.5 | L = 3<br>S = 3 | L = 3.5<br>S = 3.5 | L = 4<br>S = 4 |
| --- | --- | --- | --- | --- | --- |
| Transmittance when ($k_{11}/k_{33}$) = 0.95 | 38.21% | 40.23% | 40.22% | 37.01% | 33.83% |
| Transmittance when ($k_{11}/k_{33}$) = 0.87 | 40.51% | 40.64% | 40.57% | 35.69% | 33.42% |
| Transmittance when ($k_{11}/k_{33}$) = 0.76 | 39.54% | 40.16% | 39.67% | 37.06% | 34.49% |

Referring to FIG. 6 and Table 1 together, when the ratio of $k_{11}$ to $k_{33}$ is 0.87, better transmittance is obtained compared with the situation when the ratio is 0.95. On the other hand, when the width L of the first strip portion 702 is substantially between 2 μm and 3 μm, and the width S of the first slit 704 is substantially between 2 μm and 3 μm, the ratio being about 0.76 and 0.87 can further improve the transmittance to about 40% compared with the ratio being 0.95. However, when ($k_{11}/k_{33}$) is 0.95, if the width L and the width S are reduced from 2.5 μm to 2 μm, the transmittance of the liquid crystal display panel 10 will be reduced dramatically to 38.21%. The transmittance reduce does not appear when ($k_{11}/k_{33}$) is 0.87 and 0.76. In other words, when ($k_{11}/k_{33}$) is less than 0.87 together with L and S being less than 3 μm, and when L and S are greater than 0, the stability of the transmittance can be further provided.

In this embodiment, the liquid crystal display panel 10 selects the liquid crystal layer 600 having a feature of $0<(k_{11}/k_{33})<1$ and the thickness d, matching with the pitch p between the first strip portions 702 represented by the formula (1) or the formula (2), so that the light transmittance of the liquid crystal display panel can be improved effectively.

Figure 7:
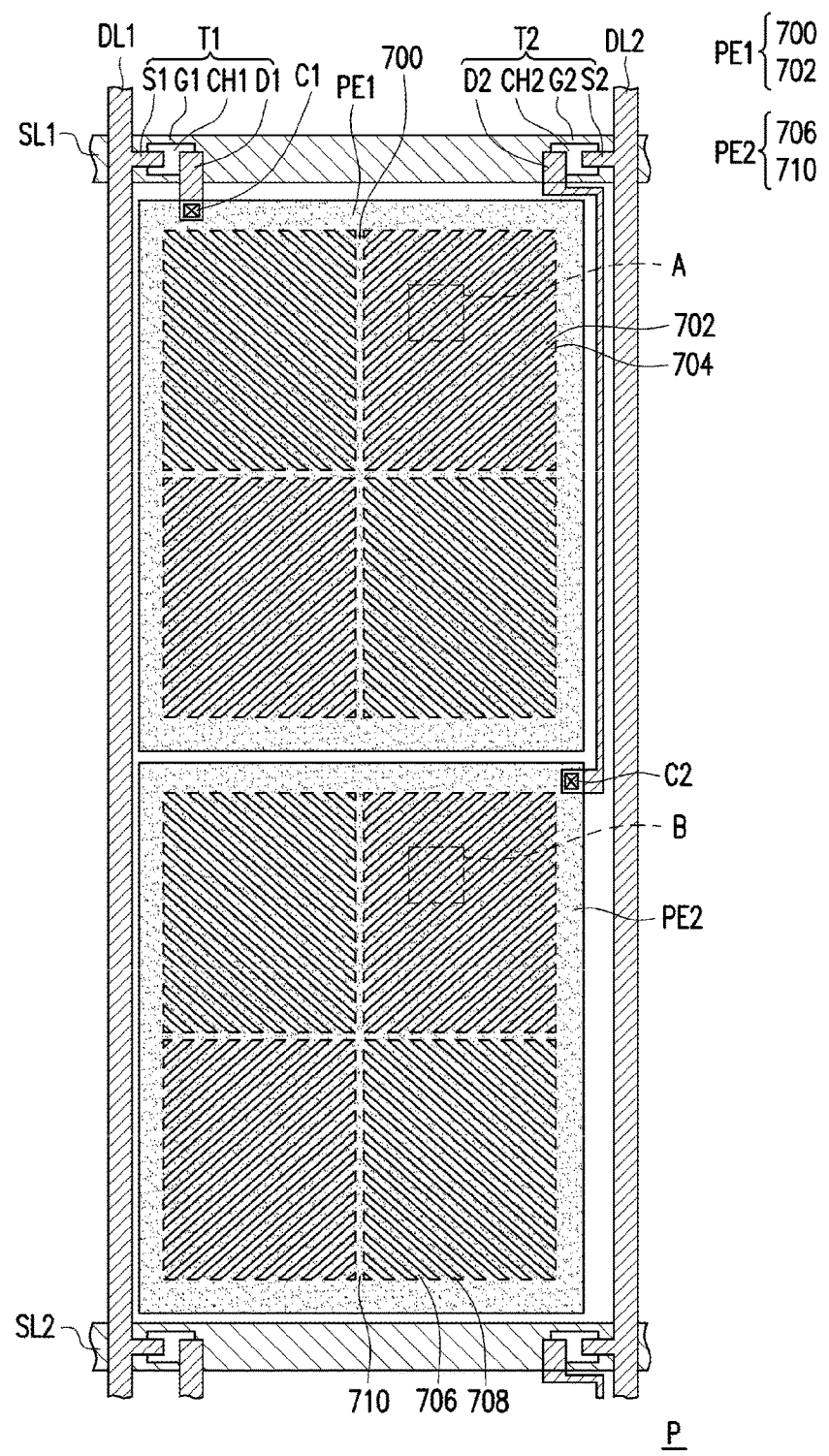
FIG. 7 is a schematic enlarged top view of a pixel structure according to another embodiment of the present disclosure.

FIG. 7 is a schematic enlarged top view of a pixel structure P according to another embodiment of the present disclosure. The pixel structure P of this embodiment is similar to that in FIG. 3, and therefore, the same elements are marked with the same reference numerals, and are not repeated herein. A difference between this embodiment and the embodiment in FIG. 3 lies in that, the pixel structure P of this embodiment further includes a second active device T2 and a second pixel electrode PE2. The second active device T2 includes a second gate G2, a second channel layer CH2, a second source S2 and a second drain D2. Referring to FIG. 7, in this embodiment, the second active device T2 is electrically connected to a corresponding scan line SL1 and a corresponding data line DL2. In particular, the second gate G2 is electrically connected to the scan line SL1. The second channel layer CH2 is located above the second gate G2. The second source S2 and the second drain D2 are located above the second channel layer CH2, and the second source S2 is electrically connected to the data line DL2. In other words, in this embodiment, the first active device T1 and the second active device T2 are connected to the same scan line SL1, and therefore, the first gate G1 and the second gate G2 are also electrically connected. Materials of elements in the second active device T2 may be the same as or different from the materials of the elements in the first active device T1, which is not specifically limited in the present disclosure. Moreover, the second pixel electrode PE2 is electrically connected to the second drain D2 of the second active device T2 through a second contact window C2. On the other hand, the pixel structure P may further include a common electrode line (not shown) connected to the common voltage (Vcom) or floating. The common electrode line is overlapped with partial of the first pixel electrode PE1 and/or partial of the second pixel electrode PE2, so as to form a storage capacitor.

Similar to the first pixel electrode PE1, the second pixel electrode PE2 also has a second body portion 710 and a plurality of second strip portions 706 connected to the second body portion 710. The second strip portions 706 are formed by extending the second body portion 710 in four directions. In other words, the second strip portions 706 extend from the second body portion 710 in four directions to edges of the second pixel electrode PE2, so as to form a fish bone pattern and define four alignment domain regions. Therefore, in the pixel structure P of this embodiment, the first pixel electrode PE1 and the second pixel electrode PE2 together define eight alignment domain regions, and adjacent two second strip portions 706 define a second slit 708.

Figure 8:
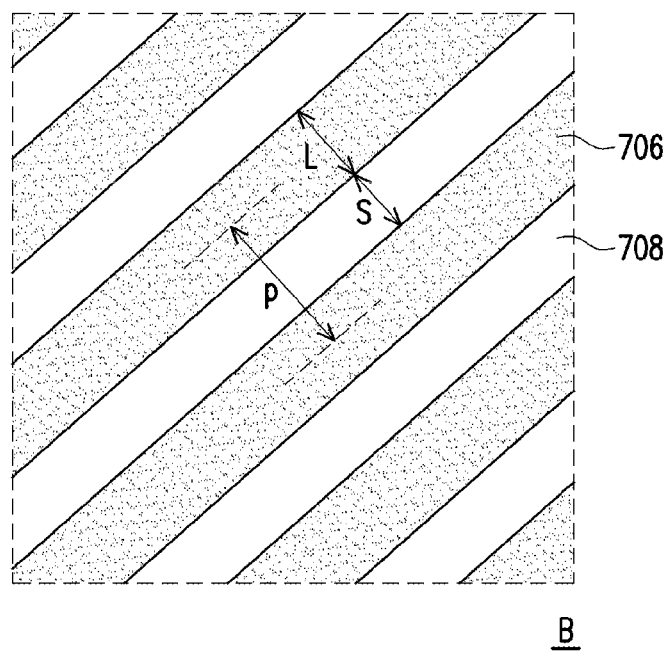
FIG. 8 is a schematic enlarged top view of a partial region in the pixel structure in FIG. 7.

FIG. 8 is a schematic enlarged top view of a partial region B in the pixel structure in FIG. 7. Referring to FIG. 8, similar to the embodiment of FIG. 4, the second strip portions 706 also has the width L, and the second slit 708 also has the width S. In addition, two adjacent second strip portions 706 have the pitch p there between, and the pitch p is equal to the sum of the width L of the second strip portion 706 and the width S of the second slit 708. Similar to the embodiment of FIG. 4, the width L of the second strip portion 706 is substantially between 2 μm and 5 μm, and the width S of the second slit 708 is substantially between 1.5 μm and 5 μm. The pitch p is the sum of the width L of the second strip portion 706 and the width S of the second slit 70; therefore, the pitch p is substantially between 3.5 μm and 10 μm, and the pitch p preferably substantial ranges from 2.9 μm to 5.9 μm. In addition, the liquid crystal display panel 10 of this embodiment also represented by the formula (1):

$$\frac{1}{2}\sqrt{\frac{k_{11}}{k_{33}}} \le \frac{p}{2d} \le \sqrt{\frac{k_{11}}{k_{33}}}. \tag{1}$$

Figure 9:
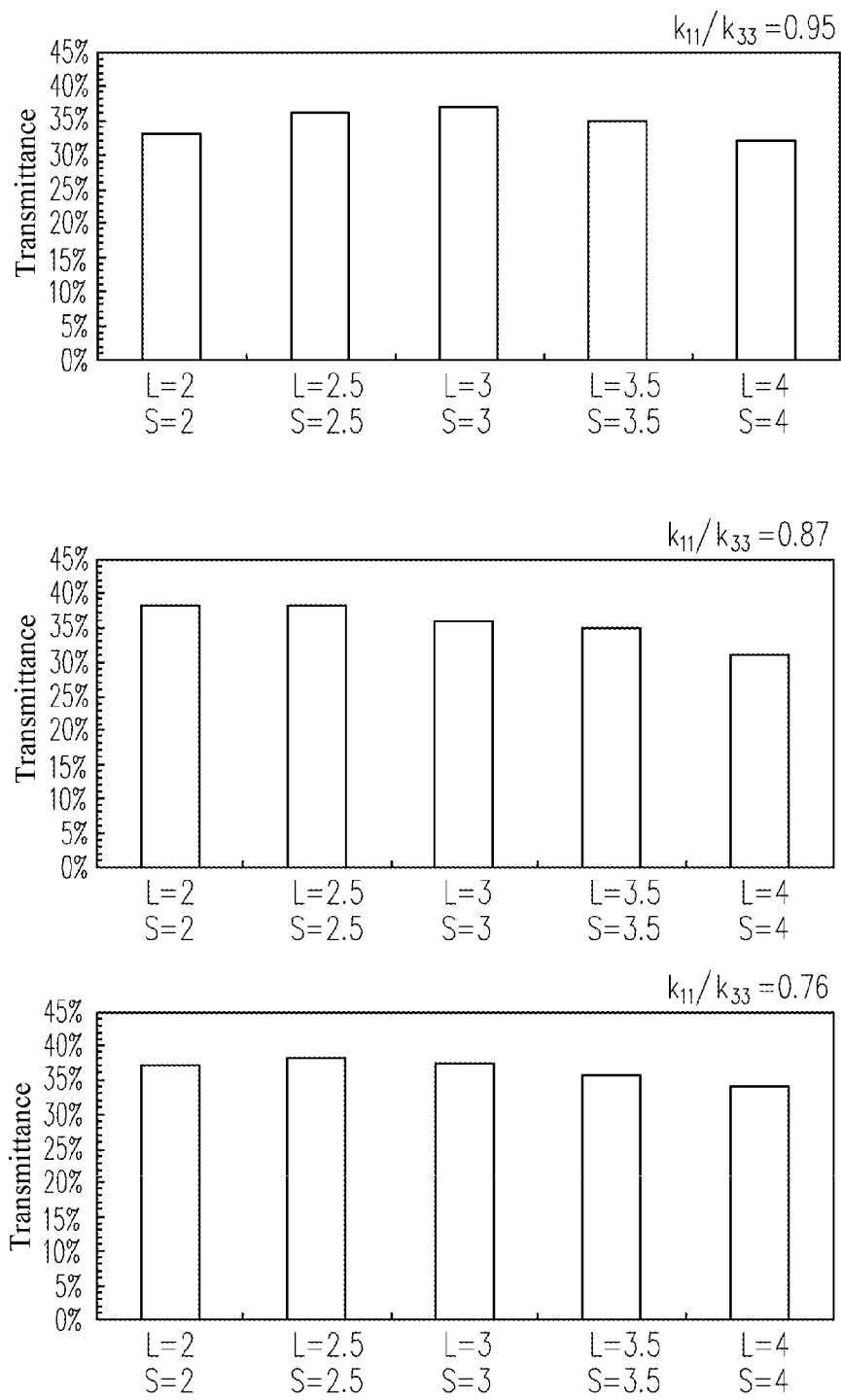
FIG. 9 is a bar chart of change in transmittance under different ($k_{11}/k_{33}$) ratios corresponding to different pitches of strip portions of the liquid crystal display panel according to the embodiment of FIG. 7 of the present disclosure.

FIG. 9 is a bar chart of change in transmittance under different $(k_{11}/k_{33})$ ratios corresponding to different pitches p of the first strip portions 702 and the second strip portions 706 of the liquid crystal display panel 10 according to the embodiment of FIG. 7 of the present disclosure. Specifically, data in FIG. 9 is obtained by applying a voltage of about 7.5 volts to the first pixel electrode PE1 and applying a voltage of about 5.15 volts to the second pixel electrode PE2 in the liquid crystal display panel 10 in FIG. 7, and the ratio of an area of PE1 and PE2 is 1:2, so as to measure the transmittance of the liquid crystal display panel 10. Specific data corresponding to FIG. 9 is shown in Table 2.

TABLE 2

| | | L = 2<br>S = 2 | L = 2.5<br>S = 2.5 | L = 3<br>S = 3 | L = 3.5<br>S = 3.5 | L = 4<br>S = 4 |
|---|---|---|---|---|---|---|
| Transmittance when $(k_{11}/k_{33}) = 0.95$ | First pixel electrode PE1 | 38.21% | 40.23% | 40.22% | 37.01% | 33.83% |
| | Second pixel electrode PE2 | 30.59% | 35.02% | 36.02% | 34.10% | 31.44% |
| | Total | 33.13% | 36.75% | 37.42% | 35.07% | 32.24% |
| Transmittance when $(k_{11}/k_{33}) = 0.87$ | First pixel electrode PE1 | 40.62% | 40.75% | 40.31% | 35.61% | 31.96% |
| | Second pixel electrode PE2 | 37.22% | 37.81% | 36.02% | 33.60% | 30.48% |
| | Total | 38.35% | 38.79% | 37.45% | 34.27% | 30.97% |
| Transmittance when $(k_{11}/k_{33}) = 0.76$ | First pixel electrode PE1 | 40.34% | 39.89% | 39.67% | 37.06% | 34.49% |
| | Second pixel electrode PE2 | 35.01% | 37.44% | 37.03% | 34.97% | 33.41% |
| | Total | 36.78% | 38.26% | 37.91% | 35.67% | 33.77% |

Referring to FIG. 9 and Table 2 together, when the ratio of $k_{11}$ to $k_{33}$ is 0.87, the transmittance is improved significantly compared with the situation when the ratio $(k_{11}/k_{33})$ is 0.95. On the other hand, when the width L of the second strip portion 706 is substantially between 2 μm and 2.5 μm, and the width S of the second slit 708 is substantially between 2 µm and 2.5 µm, the ratio being substantially 0.76 and substantially 0.87 can improve the transmittance significantly compared with the ratio being substantially 0.95. In addition, when ($k_{11}/k_{33}$) is 0.95, if the width L and the width S are reduced from 2.5 µm to 2 µm, the transmittance of the liquid crystal display panel 10 will be reduced dramatically. The above situation is not obvious when ($k_{11}/k_{33}$) is about 0.87 and 0.76. In other words, when ($k_{11}/k_{33}$) is less than 0.87 together with L and S being less than 3 µm, and when L and S are greater than 0, the stability of the transmittance can be further provided.

In this embodiment, the liquid crystal display panel 10 selects the liquid crystal layer 600 having a feature of 0<($k_{11}/k_{33}$)<1 and the thickness d, matching with the pitch p between the second strip portions 706 represented by the formula (1) or the formula (2), so that the light transmittance of the liquid crystal display panel can be improved effectively.

In view of the above, the liquid crystal display panel of the present disclosure selects a liquid crystal material having a feature of 0<($k_{11}/k_{33}$)<1 and a specific thickness, matching with a design of a specific pixel structure represented by the formula (1), so that the light transmittance of the liquid crystal display panel can be effectively improved.

The present disclosure has been disclosed in the foregoing through preferred embodiments, but the embodiments are not intended to limit the present disclosure, and any person skilled in the art can make some modifications and improvements without departing from the spirit and scope of the present disclosure; therefore, the protection scope of the present disclosure should subject to those defined in the accompanying claims.

What is claimed is:

1. A liquid crystal display panel, comprising:
   a first substrate;
   a plurality of scan lines and a plurality of data lines, disposed on the first substrate;
   a plurality of pixel structures, disposed on the first substrate, comprising:
      a first active device, electrically connected to one of the scan lines and one of the data lines; and
      a first pixel electrode, electrically connected to the first active device, the first pixel electrode having a plurality of first strip portions and a plurality of first slits, wherein two adjacent first strip portions define one of the first slits, each of the first strip portions has a first width L, each of the first slits has a first width S, each of the first strip portions has a first pitch p there between, and p=L+S;
   a second substrate, disposed to face the first substrate;
   a counter electrode layer, disposed on the second substrate, and located between the first substrate and the second substrate; and
   a liquid crystal layer, interposed between the first substrate and the second substrate, the liquid crystal layer having a thickness d between the first substrate and the second substrate, the liquid crystal layer having a splay elastic constant k11 and a bend elastic constant k33, and 0<(k11/k33)<1, wherein the liquid crystal display panel represented by a following formula (1):

$$\frac{1}{2}\sqrt{\frac{k_{11}}{k_{33}}} \leq \frac{p}{2d} \leq \sqrt{\frac{k_{11}}{k_{33}}}. \tag{1}$$

2. The liquid crystal display panel according to claim 1, further comprising:
   a first alignment layer, disposed between the pixel structures and the liquid crystal layer; and
   a second alignment layer, disposed between the counter electrode layer and the liquid crystal layer.

3. The liquid crystal display panel according to claim 1, wherein the liquid crystal display panel represented by following formula (2):

$$\frac{p}{2d} = \sqrt{\frac{k_{11}}{k_{33}}}. \tag{2}$$

4. The liquid crystal display panel according to claim 1, wherein 0<(k11/k33)<0.87.

5. The liquid crystal display panel according to claim 1, wherein the first width L is between 2 µm and 5 µm.

6. The liquid crystal display panel according to claim 1, wherein the first width S is between 1.5 µm and 5 µm.

7. The liquid crystal display panel according to claim 1, wherein the first pitch p is between 3.5 µm and 10 µm.

8. The liquid crystal display panel according to claim 1, wherein the thickness d is between 2.7 µm and 3.5 µm.

9. The liquid crystal display panel according to claim 1, wherein the splay elastic constant k11 of the liquid crystal layer is between $1.1 \times 10^{-11}$ N and $2.0 \times 10^{-11}$ N.

10. The liquid crystal display panel according to claim 1, wherein the bend elastic constant k33 of the liquid crystal layer is between $1.1 \times 10^{-11}$ N and $2.0 \times 10^{-11}$ N.

11. The liquid crystal display panel according to claim 1, wherein each of the pixel structures further comprises:
   a second active device, electrically connected to one of the scan lines and one of the data lines; and
   a second pixel electrode, electrically connected to the second active device, the second pixel electrode having a plurality of second strip portions and a plurality of second slits, wherein two adjacent second strip portions define one of the second slits, each of the second strip portions has a second width L, each of the second slits has a second width S, and each of the second strip portions has a second pitch p there between.

12. The liquid crystal display panel according to claim 11, wherein the second pixel electrode represented by the formula (1).

13. The liquid crystal display panel according to claim 11, wherein the second pixel electrode represented by following formula (2):

$$\frac{p}{2d} = \sqrt{\frac{k_{11}}{k_{33}}}. \tag{2}$$

14. The liquid crystal display panel according to claim 11, wherein 0<(k11/k33)<0.87.

15. The liquid crystal display panel according to claim 11, wherein the second width L is between 2 µm and 5 µm.

16. The liquid crystal display panel according to claim 11, wherein the second width S is between 1.5 µm and 5 µm.

17. The liquid crystal display panel according to claim 11, wherein the second pitch p is between 3.5 µm and 10 µm.

* * * * *